(12) United States Patent
Hutzelmann et al.

(10) Patent No.: US 6,853,650 B1
(45) Date of Patent: Feb. 8, 2005

(54) COMMUNICATION NETWORK, METHOD FOR TRANSMITTING A SIGNAL, NETWORK CONNECTING UNIT AND METHOD FOR ADJUSTING THE BIT RATE OF A SCALED DATA FLOW

(75) Inventors: Holger Hutzelmann, München (DE); Jens-Uwe Klocking, München (DE); Markus Zeller, Diedorf (DE); Helmut Steckenbiller, Landshut (DE); Rudi Knorr, Olching (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 0 days.

(21) Appl. No.: 09/601,651

(22) PCT Filed: Jan. 14, 1999

(86) PCT No.: PCT/EP99/00186

§ 371 (c)(1),
(2), (4) Date: Sep. 25, 2000

(87) PCT Pub. No.: WO99/40753

PCT Pub. Date: Aug. 12, 1999

(30) Foreign Application Priority Data

Feb. 5, 1998 (DE) .......................................... 198 04 564

(51) Int. Cl.[7] .................................................. H04J 3/22
(52) U.S. Cl. ...................................... 370/469; 370/468
(58) Field of Search ................................ 370/468, 469, 370/465, 466

(56) References Cited

U.S. PATENT DOCUMENTS

| 5,515,377 | A | | 5/1996 | Horne et al. |
| 5,600,646 | A | | 2/1997 | Polomski |
| 5,808,660 | A | * | 9/1998 | Sekine et al. .................. 725/76 |
| 6,148,005 | A | * | 11/2000 | Paul et al. .................. 370/469 |
| 6,181,693 | B1 | * | 1/2001 | Maresca .................. 370/352 |
| 6,510,553 | B1 | * | 1/2003 | Hazra .................. 725/87 |

FOREIGN PATENT DOCUMENTS

| DE | 4416967 | 11/1995 |
| EP | 0719055 | 6/1996 |
| WO | 95/35628 | 12/1995 |

OTHER PUBLICATIONS

RFC 2250 RTP Payload format Internet RFC/STD/FYI/BCP Archives Jan. 1998.*

"Transcodierung mit Schwerpunkt Video am Beispiel einer standardubergreifenden MCU fur Breit–und Schmalbandkommunikation", 7.Dortmunder Fernsehseminar (29.09.–01.10.97).

Yeadon, "Quality of Service Filtering for Multimedia Communications", May 1996, Computing Department Lancaster University Lancaster UK, Chapter 6 pp. 80–84.

(List continued on next page.)

*Primary Examiner*—Kwang Bin Yao
*Assistant Examiner*—Keith M. George
(74) *Attorney, Agent, or Firm*—Beyer Weaver & Thomas LLP (57) ABSTRACT

A communication network comprises a first network which permits data to be transmitted at a first bit rate and a second network which permits data to be transmitted at a second bit rate. A first terminal comprises an encoder which can generate a scaled data flow with at least two data layers from a signal to be coded. The data layers differ in their information content as regards the signal to be coded and the scaled data flow has a bit rate which is smaller than or equal to the first bit rate. A decoder is located in a second terminal and can decode a received data flow. The first and the second network are linked by a network connecting unit which can be operated so as to modify the received data flow by removing at least one data layer in such a way that the modified scaled data flow has a modified bit rate which is smaller than or equal to the second bit rate, and so as to feed the modified scaled data flow into the second network.

14 Claims, 4 Drawing Sheets

OTHER PUBLICATIONS

"Transcodierung mit Schwerpunkt Video am Beispiel einer standardubergreifenden MCU fur Breit–und Schmalbandkommunikation", 7. Dortmunder Fernsehseminar (29.09.–01.10.97).

Nagao Ogino, "A Dynamic Multistream Multicast Routing," Technical Report of the Institute of Electronics, Information and Communication Engineers, SSE97–88, IN97–79, CS97–79 (Sep. 1997), pp. 75–80.

Xue Li et al., "Layered Video Multicast with Retransmission (LVMR): Evaluation of Error Recovery Schemes," Proceedings of the IEEE 7th International Workshop on Network and Operating System Support for Digital Audio and Video (May 19–21, 1997), pp. 161–172.

Nachum Shacham et al., "Admission Control Algorithms for Multicast Sessions with Multiple Streams," IEEE Journal on Selected Areas in Communications (Apr. 1997), vol. 15, No. 3, pp. 557–566.

Shigeyuki Sakazawa et al., "A Coding and Transmission Control Scheme for Video Multicast," Video Data Media Conference (1998), vol. 52, No. 6, pp. 863–870.

* cited by examiner

COMMUNICATION NETWORK, METHOD
FOR TRANSMITTING A SIGNAL,
NETWORK CONNECTING UNIT AND
METHOD FOR ADJUSTING THE BIT RATE
OF A SCALED DATA FLOW

This application claims priority to International Patent Application No.: PCT/EP99/00186 filed Jan. 14, 1999, which claims benefit to German Patent Application No.: 19804564.6 filed Feb. 5, 1998. All of these applications are hereby incorporated by reference.

FIELD OF THE INVENTION

The present invention relates to communication systems and in particular to multiscalable communication networks in which, irrespective of the specific network conditions, an efficient transnetwork communication can be achieved by providing and processing a scaled data flow.

BACKGROUND OF THE INVENTION

In the future the main objective of the communication industry will be the fusing together of the present coexisting communication networks. The driving force in this will be the demand for mobility, increased comfort for the user and the requirement of permanent availability. The aim of modern and flexible communication systems is to provide each subscriber with information services at all times, enabling him to communicate via text, sound and video wherever in the world he may be. The terminal and network environment (especially in the subscriber area) will remain very heterogeneous even in the future. For the implementation of innovative scenarios, such as mobile office, telelearning, homeworking and global information system, it is therefore necessary to provide a transnetwork audiovisual communication and transnetwork data services. An example of such a scenario is a simultaneous videoconference with mobile telephone (GSM) and PC (LAN) and narrowband/broadband terminal (ISDN, ATM).

Figure 6:
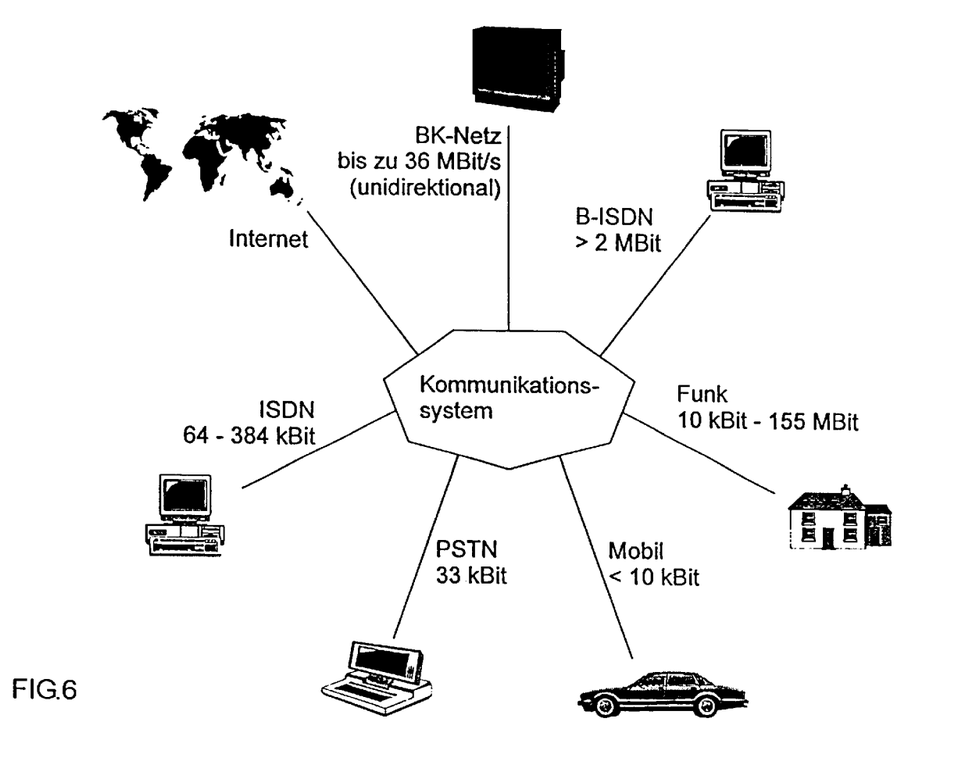
FIG. 6 shows an overview of currently existing networks which can be flexibly connected to one another in a multiscalable way.

FIG. 6 shows a selection of the plurality of existing networks, all of which are connected via a communication system. FIG. 6 also shows the respective bit rate which a network can accommodate. It can be seen that the various networks differ considerably in respect of the bit rates to be employed, the car telephone network only permitting a bit rate of less than 10 kbits, whereas a data transmission of up to 155 Mbits can be implemented by means of a superfast radio network. The Internet has no fixed bit rate since the bit rate in the Internet changes dynamically and can thus be very small when many subscribers are active whereas very high bit rates can be achieved if the Internet is relatively idle.

Devices which are capable of connecting the networks with such different bit rates shown in FIG. 6 already exist today. These devices are also called "gateways". In principle these gateways always make it possible to connect different networks together, e.g. for video conferences. The known gateways overcome the disadvantage of today's communication systems, such as telephone network, mobile network, Internet, that they exist in parallel and only permit communication with subscribers in other networks to a limited degree.

The present gateways always depend on the respective application. For example, those which are connected between a first network with a high bit rate and a second network with a lower bit rate perform a decoding of the high bit rate data flow, then perform intermediate processing such as a format conversion, a mixing of audio signals or generation of a conference image, and encode the corresponding data flow in such a way that it can be transmitted over the second network with the lower bit rate. This step is also called transcoding or conversion. This transcoding or conversion is necessary since the audio and video standards currently used are normally matched to the bandwidth of the network so as to achieve optimal quality together with the highest coding efficiency. However, these gateways require very extensive computing resources and they are very complex, resulting in high costs both in development and also during operation (maintenance, adaptation to changing applications, etc.). Furthermore, they are very inflexible, since the connection of the networks is carried out at the application level and is thus dependent on the application.

In the following an example of a traditional gateway is discussed briefly to illustrate the application dependency. An audio encoder which operates according to a known MPEG standard is considered. This can be implemented so as to deliver an output signal with a bit rate of e.g. 50 kbits per second. This bit rate could be suitable for a local area network (LAN) which accommodates such a bit rate. If the coded audio signal is to be fed into a radiotelephone network according to the GSM standard, however, the bit rate is far too high, since mobile telephone bit rates must not exceed 10 kbits/s. A gateway is therefore needed at the interface between the LAN and the mobile radio network. This gateway must have a complete audio decoder, a complete audio encoder and also the appropriate equipment for intermediate processing. The audio encoder/decoder decodes the high bit rate signal completely and then encodes it again so as to generate an output signal which can be transmitted over the mobile radio network. Apart from the fact that the decoding, the intermediate processing and the subsequent encoding involve a very high computational effort and take time, repeated decoding and recoding, which would be necessary if there are several different networks between a transmitter and a receiver, can result in additional coding errors which arise solely because of the fact that repeated decoding and recoding are necessary. This example also illustrates the application dependency. If a video signal is to be transmitted over the LAN, this is not possible with the same gateway but only with a gateway having a video encoder/decoder. If data are to be transmitted, neither an audio encoder nor a video encoder can be employed in the gateway but rather a data transcoder. In addition it must be pointed out that if e.g. audio or video signals are processed with a new coding method, it is also necessary to replace the transcoders in all the gateways which are involved.

To summarize, current gateways require considerable computational effort, take a long time, entail high costs and are totally inflexible when it comes to reacting to changing applications. The chief cause of these disadvantages is the fact that today's gateways are completely application dependent, and therefore all the ISO-OSI layers must be passed through when transcoding. Another disadvantage which can be cited is a very inflexible bandwidth or bit rate management.

DESCRIPTION OF PRIOR ART

The technical publication "Low-Complexity Video Coding for Receiver-Driven Layered Multicast", in IEEE JOURNAL ON SELECTED AREAS IN COMMUNICATIONS, Vol. 15, No. 6, August 1997, pp. 983–1001 discloses a communication network with an encoder for generating a scaled data flow with at least three data layers where a low bandwidth is required to transmit the first data layer, a medium bandwidth is required to transmit the first and the second data layer, and a high bandwidth is required to transmit all three data layers. The encoder is connected to a broadband distribution network. The broadband distribution network is connected via a narrowband network to an ISDN gateway, which is in turn connected to home subscribers. In addition the broadband distribution network is connected via a data connection of medium bandwidth to an MBone router, which in turn is connected to the Internet via a data connection with the same bandwidth. Finally, the broadband distribution network is connected to Ethernets via a broadband network connection. The network forwards only that number of layers which each physical connection can support in that it is able to remove layers selectively at each connection bottleneck. The communication network is essentially receiver-driven in that the receivers do not need to know anything about the transmitters and in that the receiver alone determines how many data layers it wishes to receive. To establish how many data layers can be transmitted in the network leading to the receiver, the receiver first requests all the data layers from the network and then reduces its demands if the network is congested. If there has been no network congestion for a considerable length of time, the receiver requests ever more data layers on a trial basis so as to always receive as many data layers as possible. The source of the data layers plays no active role in this.

SUMMARY OF THE INVENTION

It is the object of the present invention to provide a network concept which makes possible a flexible bandwidth management in the very heterogeneous network environment and which can dispense with application-dependent gateways.

In accordance with a first aspect of the present invention this object is achieved by a communication network comprising: a first network, which permits data transmission at a first bit rate; a second network, which permits data transmission at a second bit rate; a first terminal, which is connected to the first network and which has an encoder which can generate a scaled data flow with at least two data layers from a signal to be coded, the data layers differing in their information content as regards the signal to be coded and the scaled data flow having a bit rate which is smaller than or equal to the first bit rate; a second terminal, which is connected to the second network and which has a decoder by means of which a data flow which is transmittable over the second network is decodable; and a network connecting unit, which is connected between the first and the second network and which is operable so as to receive the scaled data flow from the first network, so as to modify the received data flow, by removing at least one data layer, in such a way that the modified bit rate of the modified scaled data flow is smaller than or equal to the second bit rate, and so as to feed the modified scaled data flow into the second network, where the network connecting unit further comprises: a device for gathering information on network conditions in the second network; and a device for communicating this information over a feedback channel from the network connecting unit to the first terminal so that it can respond by controlling the number of data layers generated by the encoder and/or by performing a subdivision of a data layer into a plurality of subscaling layers.

In accordance with a second aspect of the present invention this object is achieved by a method for transmitting a signal over two serially arranged networks, which permit different bit rates, comprising the following steps: coding and sending a signal for transmission so as to obtain a scaled data flow, the data layers differing in their information content as regards the signal to be coded; transmitting the scaled data flow in the first network at a first bit rate; receiving the scaled data flow; modifying the received scaled data flow by removing at least one data layer which is connected between the first and the second network, in such a way that the modified scaled data flow has a modified bit rate which is smaller than or equal to a second bit rate, the second bit rate being smaller than the first bit rate; issuing the modified scaled data flow at the second bit rate; transmitting the modified scaled data flow in the second network at the second bit rate; and receiving and decoding the modified scaled data flow to obtain a decoded signal whose information content is less than that of the signal to be transmitted, gathering information on network conditions in the second network, where the step of coding and sending is performed in response to this information so as to control the number of data layers generated when coding and/or to perform a subdivision of a data layer into a plurality of subscaling layers.

In accordance with a third aspect of the present invention this object is achieved by a network connecting unit comprising: a device for receiving from a first network a scaled data flow which has been generated by a terminal by coding and which has at least two data layers which differ in their information content as regards a signal which forms the basis of the scaled data flow; a device for modifying the scaled data flow by removing at least one data layer from the scaled data flow so as to obtain a modified scaled data flow which has a modified bit rate which is smaller than or equal to a specified bit rate; a device for issuing the modified scaled data flow at the modified bit rate into a second network; a device for gathering information on network conditions in the second network; and a device for communicating this information over a feedback channel from the network connecting unit to the first terminal so that it can respond by controlling the number of data layers generated when coding and/or by performing a subdivision of a data layer into a plurality of subscaling layers.

In accordance with a fourth aspect of the present invention this object is achieved by a method for adjusting the bit rate of a scaled data flow to a specified bit rate, comprising the following steps: receiving from a first network a scaled data flow which has been generated by a terminal by coding and which has at least two data layers which differ in their information content as regards a signal which forms the basis of the scaled data flow; modifying the scaled data flow by removing at least one data layer from the scaled data flow so as to obtain a modified scaled data flow which has a modified bit rate which is smaller than or equal to a specified bit rate; issuing the modified scaled data flow at the modified bit rate into a second network; gathering information on network conditions in the second network; and communicating this information over a feedback channel from the network connecting unit to the first terminal so that it can respond by controlling the number of data layers generated when coding and/or by performing a subdivision of a data layer into a plurality of subscaling layers.

The present invention is based on the finding that the problems which have been described can be solved by means of a multiscalable communication system. The multiscalable communication system according to the present invention is primarily characterized by a scalable encoder in the transmitter which can provide a layer representation of video data or audio data and also a network connecting unit according to the present invention which connects two networks with different bit rates and which modifies the received data flow, which comprises a plurality of data layers, in such a way that it can be fed into the second network with e.g. a lower bit rate. This modification does not consist of a complete decoding and subsequent coding, however, but simply in the culling of sufficient data layers that it is possible to transmit the modified data flow, which has fewer data layers than the inserted data flow, over the second network.

The concept of the multiscalable communication system provides the fundamentals or conditions which enable existing networks to be connected flexibly, effectively and cheaply to form a "global complete network" without having to change important constituents of the existing network infrastructure. As a result it is possible to integrate all sorts of networks, from e.g. analog networks (PSTN) up to mobile digital radio networks (GSM, UMTS). The field of application should range from individual communication up to distributed or broadcast communication. The generation, transmission and modification of scaled data flows then permits dynamic bandwidth matching at network transitions in that layers which exceed the available bandwidth are culled. In addition the bandwidth distribution within a network can be dynamically regulated on the basis of the data layer representation of the transmitted data flows.

Furthermore, the network connecting units are much easier to implement, require considerably less computational effort, making them more cost efective, and are flexible since the data to be converted between the networks no longer have to be brought to the application level since simply at least one data layer has to be culled.

Finally, the decoders or receivers in the multiscalable communication system according to the present invention are practically independent of the performance of the terminals in which they are implemented since due to the layer representation of the data all higher layers can be culled after the basic layer has been processed. This means that though changes may be made on the source side, e.g. when new, improved encoders are employed, the subscribers existing decoders can still decode the newly created data flow by coding only the basic layer or the first expansion layer and culling the new higher layers. If a subscriber then decides to buy a new decoder, the full quality is at his disposal. This means that in a scalable communication network the compatibility between any existing decoders and new encoders on the source side is always ensured.

BRIEF DESCRIPTION OF THE DRAWINGS

Preferred embodiments of the present invention are described in more detail below making reference to the enclosed drawings, in which.

DETAILED DESCRIPTION OF THE PREFERRED EMBODIMENTS

In the following the fundamental composition of a communication network according to the present invention is described making reference to FIG. 1. The communication network according to the present invention has a first network 10 which permits data transmission at a first bit rate. The communication network also has a second network 12 which permits data transmission at a second bit rate. A first terminal 14 is connected to an input of the first network 10 and a second terminal 16 is connected to the output of the second network 12. The first terminal 14 has an encoder, which can generate a scaled data flow with at least two data layers from a signal to be coded. The data layers differ in their information content in respect of the signal to be coded and the scaled data flow has a bit rate which is smaller than or equal to the first bit rate. This means that the output signal of the first terminal 14 can be fed into the first network 10. In addition a network connecting unit according to the present invention 18 is connected between the first network 10 and the second network 12. The network connecting unit 18 performs the following functions. On the one hand it is able to receive the scaled data flow from the first network 10. Furthermore, it modifies the received data flow by removing at least one data layer from the scaled data flow in such a way that the modified scaled data flow has a modified bit rate which is smaller than or equal to the second bit rate, care being taken to see that the bit rate of the basic layer is smaller than the bit rate of the second network in order that communication be possible at all. If the latter condition is not fulfilled, the network connecting unit can send an error message to the encoder in the transmitter to inform it that the second network requires a data flow which has a basic layer with a smaller bit rate. In response to this error message the transmitter could, in the present scenario, so reconfigure the encoder that the basic layer bit rate requirement is fulfilled.

If the bit rate of the second network is large enough to transmit all the data layers, the network connecting unit will not of course remove any data layers from the data signal. Finally, the network connecting unit 18 can feed the modified scaled data flow into the second network 12.

It should be noted at this point that in this patent application the bit rate always refers to the individual connection. This bit rate can thus be smaller than the bit rate which the network provides, e.g. if a number of subscribers share the full bit rate of a network.

Figure 1:
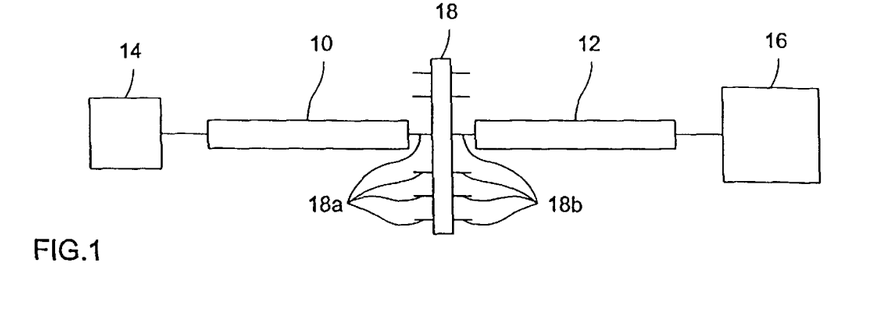
FIG. 1 shows a schematic representation of a simple communication network according to the present invention.

As has already been mentioned, FIG. 1 depicts a fundamental representation of a communication network according to the present invention. As can be seen from FIG. 1, the network connecting unit typically has additional inputs 18a and also additional outputs 18b. This means therefore that in real applications a network connecting unit can typically be connected to a plurality of networks on the input side and, similarly, to a plurality of networks on the output side. If this is the case, the object is to transmit data from a network connected on the input side to another network connected on the output side or to a plurality of networks connected on the output side if the data are to be distributed ("broadcasting"). An alternative situation is that where data from a plurality of input networks are to be multiplexed into just one output network. Such a network connecting unit is also called a router.

In the description so far the assumption has been that the first terminal 14 has only one encoder and the second terminal 16 has only one decoder. In this configuration the communication network according to the present invention, which is shown in FIG. 1, would only be capable of a unidirectional transmission, namely from the first terminal 14 as transmitter to the second terminal 16 as receiver. It is obvious, however, that both the first terminal 14 and the second terminal 16 can be equipped with encoders and decoders, whereby the communication network according to the present invention permits bidirectional data transmissions. In this case the terminals 18b would then be the inputs of the network connecting unit 18 and the terminals 18a would be the outputs of the network connecting unit 18. It should be noted, however, that, for the sake of clarity, a unidirectional network in which the first terminal 14 is the transmitter and the second terminal 16 is the receiver is considered in the following. For persons skilled in the art it is, however, obvious how to make analogous use of the teachings according to the present invention so as to construct a bidirectional network according to the present invention on this basis.

Figure 2A:
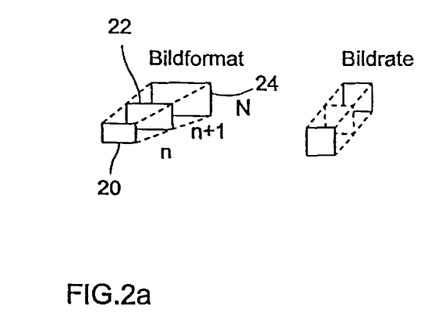
FIG. 2a shows an illustration of possible scaling layers and 2b and the processing of the layers in a network connecting unit according to the present invention.

In the following FIG. 2a is considered in order to describe the scalability in terms of a video signal. Generally speaking, scalability is possible as regards image quality, image rate or image format, the result of the scaling being a variable bit rate. Scalable encoders can e.g. be encoders which work according to the Standard MPEG-4. A functional description is to be found in the Standard MPEG-4. The figure on the left in FIG. 2a shows scalability as regards the image format. A first basic layer 20 contains e.g. just the information from a central section of a recorded video signal. That is to say, the whole of the available video image format is not coded into a single data flow; instead the basic layer 20 contains just a portion of suitable size from the middle of the video image. The first expansion layer 22 will then encompass a somewhat larger portion and a second expansion layer 24 will have the complete video format in coded form. The three layers 20, 22, 24 thus differ in their information content as regards the original video signal in that the basic layer 20 has only a low information content whereas the first expansion layer 22 has a somewhat higher information content and the second expansion layer has a still higher information content, in this case the maximum information content. Since the basic layer has a low information content it can, however, also be transmitted at a much lower bit rate than the second expansion layer 24. For certain applications it can suffice, in the interests of a fast transmission over a narrow-band network, that an observer sees only the central portion of a video image, not being as interested in the outer parts of the frame, e.g. in order to get a general view of a video sequence. A further scaling possibility is shown on the right in FIG. 2a. Here a basic layer could encompass just every second image or frame of a video sequence, while the first expansion layer could code all the frames. However, it is also conceivable to code e.g. just every fifth frame or even every tenth frame in the basic layer and to create any number of expansion layers which, in succession, would then encompass the intermediate frames. In this way at least an impression of the video sequence, e.g. by means of every tenth frame, can be transmitted even over a narrow-band network.

A further scaling possibility is to code e.g. every fifth pixel in a line and every fifth pixel in a column from a complete video image in the basic layer. The basic layer would then encompass the complete video format and also every single video image but with a reduced image quality. The expansion layers could then contain intermediate pixels, there being freedom of choice as regards the composition of each expansion layer.

Figure 2B:
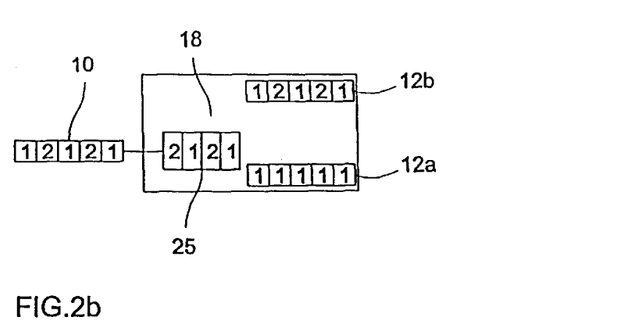

In the case of audio signals e.g. only the frequency range 0–4 kHz of such a signal might be coded into the basic layer. A basic layer receiver would then be presented with a signal which possesses roughly telephone quality. A second expansion layer could now code the audio bandwidth up to a maximum frequency of e.g. 12 kHz, which would enable a receiver to hear an audio signal in hi-fi quality. A third expansion layer could then contain the coded audio signal with a bandwidth of e.g. 16 kHz, which would result in an audio signal in CD quality at a receiver. In the following the relationship between the expansion layers and the basic layer is considered. As has already been mentioned, the basic layer always contains data which are to be decoded alone. A receiver can decode the basic layer and obtains e.g. a video signal or an audio signal, though with quality or information deficiencies. The first expansion layer can then in turn be so implemented that it also contains a complete signal, whereby the first expansion layer can be decoded independently of the basic layer. However, this would lead to repetition of the whole of the basic layer information and thus to an unnecessary growth of data in the network. Thus the expansion layer preferably contains only the information additional to that in the basic layer. This, however, means that the expansion layer cannot be decoded on its own but only together with the basic layer. This situation is shown in FIG. 2b, which shows a scaled data flow from a first network 10 which is fed into the network connecting unit 18. Here the network connecting unit 18 includes a buffer 25 in which a received portion of the incoming scaled data flow has been stored. The network connecting unit 18 has two outputs for the example shown in FIG. 2. In particular, the incoming data flow is distributed among two output networks 12a and 12b. The first network 12a permits only a transmission with a relatively low bit rate, for which reason only the first layer, which is labelled "1", is transmitted. The second network 12b permits a transmission with a higher bit rate, however, for which reason both layers are fed into it. Because of the present implementation of the scalability, however, the second network requires both the basic layer 1 and also the first expansion layer 2, since the first expansion layer 2 can only be decoded together with the basic layer 1. The possibility also exists, however, that the second network 12b does not lead directly to a second terminal 16 but to yet another network connecting unit to the output side of which a plurality of networks are connected among which the signal on 12b is to be distributed. The preference would then always be to have all the layers, i.e. the basic layer and the first expansion layer, available, so as to be able to distribute a signal of the highest possible quality to as many places in the network as possible.

Figure 3:
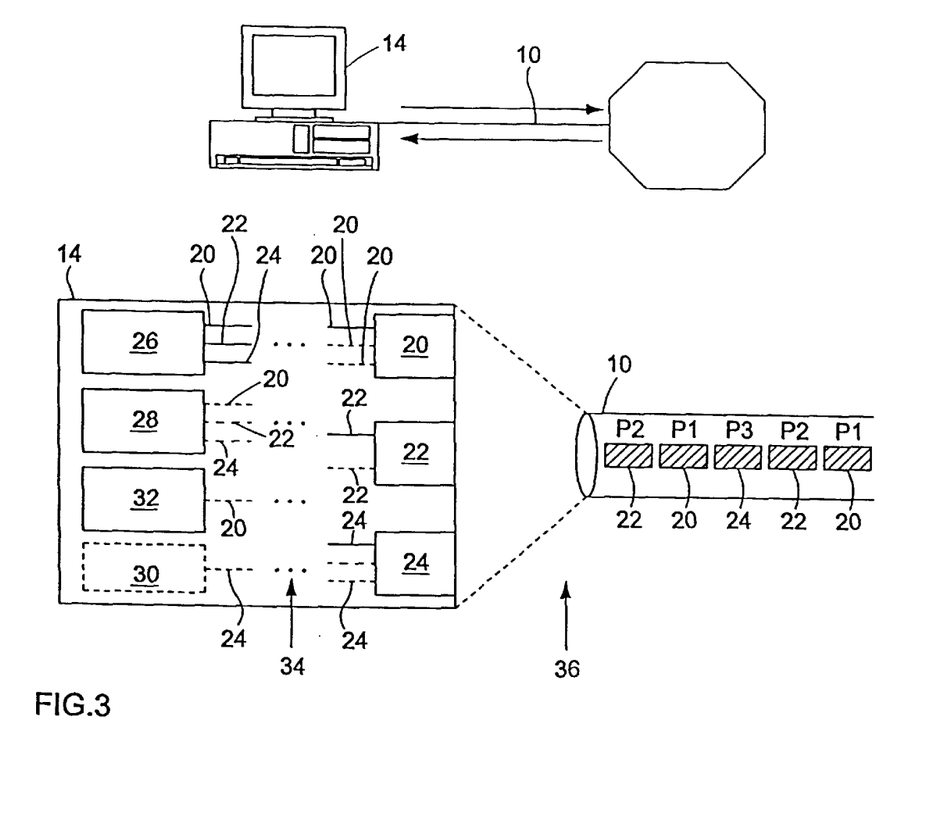
FIG. 3 shows a detailed representation at one end of the network. i.e. the interoperation of a terminal with a network.

FIG. 3 shows schematically the situation at a terminal 14 or 16 and the corresponding connected network. For reasons of clarity it is assumed that in FIG. 3 it is a question of the first terminal 14 which is connected to the first network 10. The encoder in the first terminal 14 may comprise a plurality of subcoders, e.g. a scalable video encoder/decoder 26, a scalable audio encoder/decoder 28 and a data encoder 30. The encoder in the first terminal might also include a control unit 32, which generates adapted terminals/network control parameters. The scalable video encoder 26 and the scalable audio encoder 28 each have three outputs, which is meant to show schematically that both can generate a basic layer 20, a first expansion layer 22 and a second expansion layer 24. The individual encoders are connected via a multiplexer 34 to three encoder output stages, namely the basic stage 20, the expansion stage 22 and the expansion stage 24. These three stages constitute a network interface 36 with the first network 10. It can be seen from FIG. 3 that, via the multiplexer 34, the basic stage contains the basic layer both of the scalable video encoder/decoder and of the scalable audio encoder/decoder. The output signal of the terminals/network control is conveyed to the basic stage via its third input and is thus also present in the basic layer. The first expansion stage contains both the first stage 22 of the video encoder/decoder and the first expansion layer of the audio encoder/decoder. The third stage, i.e. the second expansion stage 24, contains the second expansion layer of both encoders and also additionally coded data from the data encoder 30.

It should be noted here that audio, video and data flows can be transmitted separately over "virtual" channels. In this case the layers of these data flows do not appear together in one packet but in separate packets.

Preferably the data transmission in the network is effected by packets P1, P2 and P3. Packets P1 are then basic layer packets, while packets P2 contain data for the first expansion layer 22 and packets P3 transmit data for the second expansion layer 24. In summary it can therefore be said that the terminal 14 delivers a data flow which is divided up into scaling layers and where the information which is essential for the communication is collected together in the basic layer. An arbitrary number of expansion layers permits the quality of the applications (video, audio, etc.) to be scaled.

In a preferred embodiment of the present invention the respective scaling layer is indicated in a determination data block which precedes the corresponding data packet. The bit rate of the various scaling layers can here be known a priori.

In the following two possibilities are described by means of which the network connecting unit 18 can modify an incoming scaled audio data flow so that the bit rate of the modified scaled data flow is adapted to the second network, i.e. the network connected on the output side. One possibility is to reserve a bit rate in the second network 12 if the network is suitably designed. The network connecting unit 18 then determines iteratively via a summation of the bit rates from each scaling layer whether the sum is smaller than or equal to the bit rate which can be reserved for the second network. In a first step an attempt is made to pass on the whole scaled data flow without modification so as to transmit the maximum bandwidth. If this fails, however, the highest expansion layer is culled and a check is made to see whether the remaining bit rate is suitable for transmission over the second network, i.e. if it is smaller than or equal to the bit rate of the second network. If this is still not the case, the second highest expansion layer is also culled, and so on, until the condition is fulfilled that the bit rate of the modified scaled data flow is smaller than or equal to the reservable bit rate.

The network connecting unit 18 can be so adjusted that it carries out this bit rate reservation on request or automatically. This is advantageous when the bit rate of the input data flow changes during the existence of the connection. If a function for changing the bit rate for an existing connection is available for the output connection, the output bit rate can be adjusted to the changed input bit rate.

A further possibility for establishing a connection results not through reserving the connection but by dynamically determining the bit rate. To do this the network connecting unit 18 must enter into contact with the second network 12 and check what bit rate is currently available.

The bit rate at the input and at the outputs of the router can be determined via time stamps and a reference time of the router. The data packets present in an interval (currently valid time stamp) must be dispatched in the same interval. If this is not possible, from the next interval onwards a correspondingly smaller number of scaling stages is sent.

The bit rate at the outputs is monitored continuously so as to allow a larger number of scaling stages to be sent again as conditions permit. If the data transmission is isochronous, the time stamps can be determined implicitly from the time of arrival of the data.

If a bit rate cannot be reserved for the connection at the output of the network connecting unit 18, therefore, the number of scaling layers to be sent must be determined dynamically, wherefore, as already mentioned, the currently available bit rate is determined.

Figure 4:
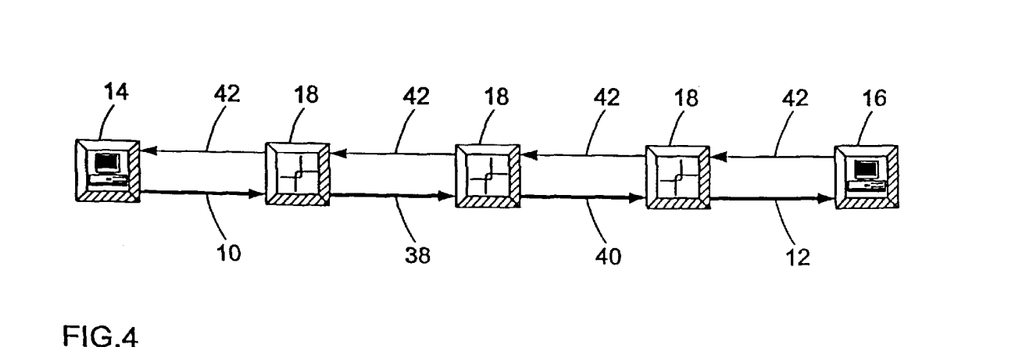
FIG. 4 shows a schematic representation of a cascade of different networks and network connecting units.

FIG. 4 shows a communication network according to the present invention having a terminal 14 and a further terminal 16 and also a plurality of network connecting units 18. The network connecting units 18 are interconnected via a number of networks with arbitrary bit rates. The data flow over the individual networks 10, 38, 40, 12 is symbolized by the thick arrows. It should be noted that the network according to the present invention between the first network 10 and the second network 12 can have an arbitrary number of network connecting units 18 and networks 38, 40, as can be seen from FIG. 4. The thin arrows in FIG. 4 represent a control flow 42 in the opposite direction to the data flow. This control flow serves for the optimal adaptation of the transmitter in the first terminal 14, or of its encoder, to the current network conditions or the current receiver 16. The receiver can inform the transmitter over the control or feedback flow 42 for how many stages it is designed. In response the transmitter can change the arrangement of its coding layers so as to be optimally adapted to the receiver. To achieve this the highest number of scaling layers used by the current subscribers is communicated to the preceding network connecting unit 18 via a protocol. This network connecting unit 18 can then reduce the scaling layers to be sent to the maximum number of scaling layers required. On the one hand the dynamic modification of the bit rate permits quick adaptation to current network conditions by adjusting the number of scaling layers to be transmitted, on the other hand the feedback of network parameters back to the transmitter permits to adjust the structure of the scalable data flow to meet fundamental changes in the network. For example, if a mobile radio subscriber is added, the basic layer 20 can be further subdivided so as to provide scalability in the mobile radio network itself as well. Further measures, which can be accomplished as alternatives to the modification of the structure of the scalable data flow, are to adjust the packet size of the data flow, the implementation of error protection possibilities, the use of different types of coding and so on.

Figure 5:
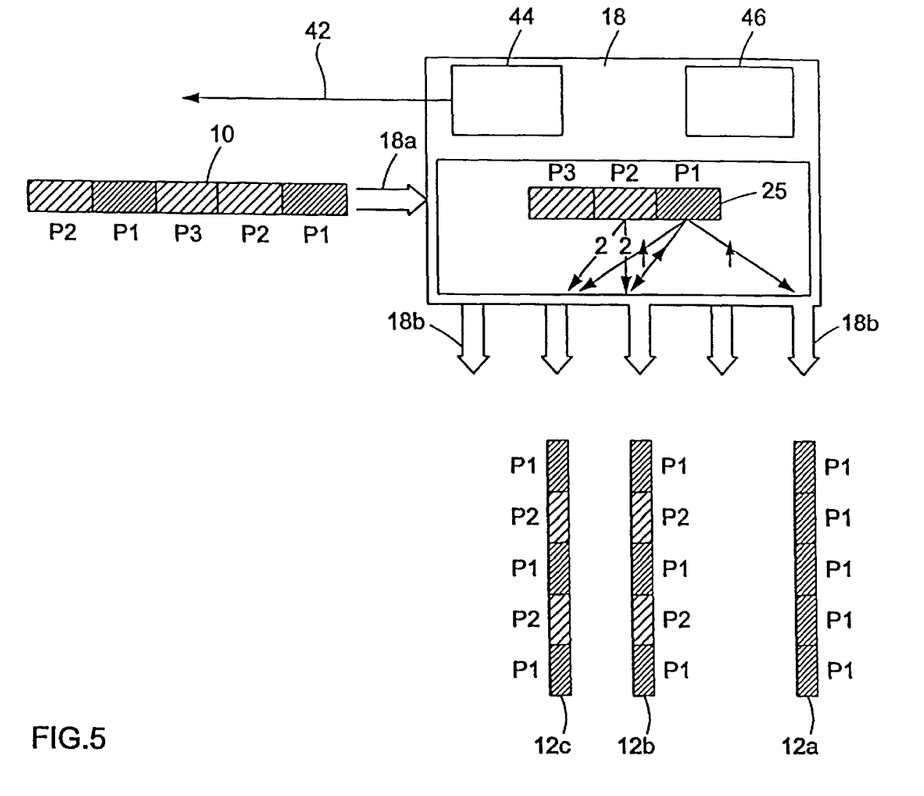
FIG. 5 shows a detailed representation of a network connecting unit according to the present invention which is connected to a plurality of networks on the output side.

FIG. 5 shows a detailed representation of the network connecting unit 18. The network connecting unit 18 is connected to the first network 10 via the input 18a. The network connecting unit 18 has a plurality of outputs 18b connected to second networks 12a, 12b and 12c. As can be seen from FIG. 5, the second network 12a has a lower bit rate than the other networks 12b and 12c since only the basic layer P1 can be transmitted in the network 12a whereas both the basic layer P1 and the first expansion layer P2 can be transmitted in the networks 12b and 12c. It is also clear that the second expansion layer (P3) is not transmitted in any of the networks on the output side since, in the example shown, none of the second networks 12 connected to the network connecting unit 18 via an output 18b permits a data transmission with a sufficiently high bit rate that all the layers of the scalable data flow can be transmitted.

The network connecting unit 18 also has a device 44 for determining the number of scaling layers used for the networks connected on the output side together with a device 46 which determines from which input or inputs which output or outputs are to be served. The device 46 is thus the routing device, which is responsible for the routing of the data packets by means of special routing protocols.

The mode of operation of the network connecting unit 18 in routing operation can be described as follows. The first n scaling layers of the input data flow are taken into a buffer 25. The data determination block of each packet is then examined to determine to which stage a certain packet belongs. It is then possible to start copying the data packets into the corresponding networks on the output side. In the example shown, the packets of the basic layer p1 are copied into all three networks connected on the output side while the packets P2 of the first expansion layer are copied only to the two networks 12b and 12c and the packets P3 of the second expansion layer are culled.

What is claimed is:

1. A communication network comprising:
   a first network, which permits data transmission at a first bit rate;
   a second network, which permits data transmission at a second bit rate;
   wherein the first network and the second network are such that the first bit rate and the second bit rate are different from each other;
   a first terminal, which is connected to the first network and which has an encoder which can generate a scaled data flow with at least two data layers from a signal to be coded, the data layers differing in their information content as regards the signal to be coded and the scaled data flow having a bit rate which is smaller than or equal to the first bit rate;
   a second terminal, which is connected to the second network and which has a decoder by means of which a data flow which is transmittable over the second network is decodable; and
   a network connecting unit, which is connected between the first and the second network and which is operable
   so as to receive the scaled data flow from the first network,
   so as to modify the received data flow, by removing at least one data layer, in such a way that the modified bit rate of the modified scaled data flow is smaller than or equal to the second bit rate,
   and
   so as to feed the modified scaled data flow into the second network,
   where the network connecting unit (18) further comprises;
   a device for gathering information on network conditions in the second network; and
   a device for communicating the information over a feedback channel from the network connecting unit to the first terminal
   wherein the first terminal is adapted to control the number of data layers generated by the encoder or to perform a subdivision of a data layer into a plurality of subscaling layers, in response to the information.

2. A communication network according to claim 1, wherein both the first and the second terminal have both an encoder and a decoder, thereby enabling bidirectional data transmission.

3. A communication network according to claim 1, wherein the encoder in the terminal comprises;
   a plurality of subcoders for a plurality of source signals to be coded which provided separate packets for each data layer;
   a network interface with a plurality of scaling layers for the serial feeding of data packets from different scaling layers into the first network; and
   a multiplexer for distributing the data packets from the subcoders among the scaling layers or for multiplexing the packets generated by the subcoders onto separate virtual channels.

4. A communication network according to claim 3, wherein the scaling layers added to each issued data packet a determination data block which indicates the data layer to which the corresponding packet belongs.

5. A communication network according to claim 1, wherein a connection of the network connecting unit with the second network can be set up with reservation and wherein the network connecting unit further comprises:
   a device for ascertaining the modified bit rate, where the sum of the bit rates of the lowest data layers must be smaller than or equal to the second bit rate; and
   a device for reserving the modified bit rate in the second network.

6. A communication network according to claim 1, wherein a connection between the network connecting unit and the second network can be set up without reservation and wherein the network connecting unit further comprises:
   a device for ascertaining the available bit rate in the second network; and
   a device for ascertaining the modified bit rate, where the sum of the bit rates of the lowest data layers must be smaller than or equal to the second bit rate.

7. A communication network according claim 1, wherein the network connecting unit is connected on the output side to a plurality of networks and where the network connecting unit further comprises:
   a device for determining the number of data layers which can be fed into each of the networks located on the output side;
   a buffer for buffering at least one data packet for each data layer;
   a device for demultiplexing the buffered data packets into the data layers of the scaled data flow; and
   device for copying the data packets to the corresponding networks connected on the output side, taking account of the number of data layers determined for each network.

8. A communication network according to claim 1, wherein the network connecting unit is designed to communicate network condition information to the encoder over the feedback channel in the form of network parameters relating to the minimal bit rate of a network section and information on the highest number of data layers which a decoder in a terminal decodes, so that the encoder can control dynamically the number of data layers of the scaled data flow.

9. A communication network according to claim 1, wherein the network connecting unit is designed to communicate such information on the network conditions of the second network to the encoder of the first terminal over the feedback channel, so that the encoder responds by adjusting a packet size of the scaled data flow, implementing error protection possibilities or employing different types of coding.

10. A communication network according to claim 1, wherein the signal to be coded comprises a video signal and where the data layers differ in the number of images of a video sequence which are ignored or in the image formats of the individual video images or in the image quality, e.g. the number of pixels per image, distortions in the image, different image formats.

11. A communication network according to claim 1, wherein the signal to be coded comprises an audio signal and where the data layers differ in the audio bandwidth of the signal coded in a data layer.

12. A method for transmitting a signal over a first network and a second network which are serially arranged, the first network permitting data transmission at a first bit rate, the second network, permitting data transmission at a second bit rate, wherein the first network and the second network are such that the first bit rate and the second bit rate are different from teach other, comprising the following steps:

coding and sending a signal for transmission so as to obtain a scaled data flow, the data layers differing in their information content as regards the signal to be coded;

transmitting the scaled data flow in the first network at a first bit rate;

receiving the scaled data flow;

modifying the received scaled data flow by removing at least one data layer which is connected between the first and the second network, in such a way that the modified scaled data flow has a modified bit rate which is smaller than or equal to a second bit rate, the second bit rate being smaller than the first bit rate;

issuing the modified scaled data flow at the second bit rate;

transmitting the modified scaled data flow in the second network at the second bit rate for receiving and decoding the modified scaled data flow to obtain a decoded signal whose information content is less than that of the signal to be transmitted; and gathering information on network conditions in the second network, where the step of coding and sending is performed in response to the information so as to control the number of data layers generated when coding or to perform a subdivision of a data layer into a plurality of subscaling layers.

13. A network connecting unit for connecting a first network, which permits data transmission at a first bit rate, and a second network, which permits data transmission at a second bit rate, wherein the first network and the second network are such that the first bit rate and the second bit rate are different from each other, comprising:

a device for receiving from the first network a scaled data flow which has been generated by a terminal by coding and which has at least two data layers which differ in their information content as regards a signal which forms the basis of the scaled data flow;

a device for modifying the scaled data flow by removing at least one data layer from the scaled data flow so as to obtain a modified scaled data flow which has a modified bit rate which is smaller than or equal to a specified bit rate;

a device for issuing the modified scaled data flow at the modified bit rate into the second network;

a device for gathering information on network conditions in the second network; and a device for communicating the information over a feedback channel from the network connecting unit to the first terminal so that the first terminal responds to the information by controlling the number of data layers generated when coding or by performing a subdivision of a data layer into a plurality of subscaling layers.

14. A method for adjusting the bit rate of a scaled data flow to a specified bit rate, comprising the following steps:

receiving from a first network a scaled data flow which has been generated by a terminal by coding and which has at least two data layers which differ in their information content as regards a signal which forms the basis of the scaled data flow;

modifying, by a network connecting unit, the scaled data flow by removing at least one data layer from the scaled data flow so as to obtain a modified scaled data flow which has a modified bit rate which is smaller than or equal to the specified bit rate;

issuing the modified scaled data flow at the modified bit rate into a second network, wherein the first network permits data transmission at a first bit rate, wherein the second network permits data transmission at a second bit rate, and wherein the first network and the second network are such that the first bit rate and the second bit rate are different from each other; gathering information on network conditions in the second network;

communicating the information over a feedback channel from the network connecting unit to the terminal; and in the first terminal, controlling the number of data layers generated when coding or performing a subdivision of a data layer into a plurality of subscaling layers, in response to the information.

* * * * *